United States Patent
Fiess et al.

(10) Patent No.: US 11,143,801 B2
(45) Date of Patent: Oct. 12, 2021

(54) DIFFRACTIVE OPTICAL ELEMENT AND METHOD FOR THE MANUFACTURE THEREOF

(71) Applicant: Robert Bosch GmbH, Stuttgart (DE)

(72) Inventors: Reinhold Fiess, Durbach (DE); Tobias Graf, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 395 days.

(21) Appl. No.: 16/117,489

(22) Filed: Aug. 30, 2018

(65) Prior Publication Data
US 2019/0079224 A1    Mar. 14, 2019

(30) Foreign Application Priority Data
Sep. 8, 2017 (DE) .................... 102017215850.6

(51) Int. Cl.
| | |
|---|---|
| G01C 3/08 | (2006.01) |
| G02B 5/18 | (2006.01) |
| G01S 17/931 | (2020.01) |
| G01S 17/88 | (2006.01) |
| G01S 7/481 | (2006.01) |

(52) U.S. Cl.
CPC .......... *G02B 5/1819* (2013.01); *G01S 7/4815* (2013.01); *G01S 17/88* (2013.01); *G01S 17/931* (2020.01); *G02B 5/1847* (2013.01); *G02B 2005/1804* (2013.01)

(58) Field of Classification Search
CPC ............... G02B 5/1819; G02B 5/1847; G02B 2005/1804; G02B 5/1866; G01S 17/88; G01S 17/931; G01S 7/4815; G01S 7/481
See application file for complete search history.

(56) References Cited

U.S. PATENT DOCUMENTS

| | | | | |
|---|---|---|---|---|
| 7,436,588 B2 * | 10/2008 | Rothenberg | ....... | B23K 26/0604 359/349 |
| 7,773,204 B1 * | 8/2010 | Nelson | .................. | G01S 7/4972 356/5.02 |
| 7,856,160 B2 * | 12/2010 | Yamauchi | .......... | G02B 27/1093 385/37 |
| 9,234,618 B1 * | 1/2016 | Zhu | ......................... | G01S 7/497 |
| 2003/0019931 A1 * | 1/2003 | Tsikos | .................... | G06K 9/325 235/454 |
| 2006/0227317 A1 * | 10/2006 | Henderson | .............. | G01S 17/89 356/28 |
| 2008/0043334 A1 * | 2/2008 | Itzkovitch | ............ | G02B 5/1857 359/569 |

(Continued)

FOREIGN PATENT DOCUMENTS

| | | |
|---|---|---|
| DE | 102013209436 A1 | 11/2014 |
| EP | 0648340 B1 | 6/1999 |

*Primary Examiner* — Samantha K Nickerson
(74) *Attorney, Agent, or Firm* — Norton Rose Fulbright US LLP; Gerard Messina (57) ABSTRACT

A diffractive optical element includes at least two diffractive structures situated next to one another, having differing functionalities, and being configured to, responsive to being irradiated independently of one another with incoherent laser light from beams of their respectively coupled laser sources, generate respective diffraction patterns that do not interfere with one another and that combine as an overall diffraction pattern in a far field. A method is provided for manufacturing such a diffractive optical element.

12 Claims, 6 Drawing Sheets

Stand der Technik (56) References Cited

U.S. PATENT DOCUMENTS

| | | | |
|---|---|---|---|
| 2010/0046953 A1* | 2/2010 | Shaw | H01S 5/423 |
| | | | 398/115 |
| 2014/0307055 A1 | 10/2014 | Kang et al. | |
| 2016/0320488 A1 | 11/2016 | Slobodyanyuk et al. | |
| 2017/0082736 A1* | 3/2017 | Hofmann | G01S 17/04 |
| 2018/0059304 A1* | 3/2018 | Bhargava | G02B 5/1866 |
| 2018/0083363 A1* | 3/2018 | Izadian | H01Q 19/10 |

* cited by examiner

Fig. 1
Stand der Technik

DIFFRACTIVE OPTICAL ELEMENT AND METHOD FOR THE MANUFACTURE THEREOF

CROSS-REFERENCE TO RELATED APPLICATIONS

The present application claims priority under 35 U.S.C. § 119 to DE 10 2017 215 850.6, filed in the Federal Republic of Germany on Sep. 8, 2017, the content of which is hereby incorporated by reference herein in its entirety.

FIELD OF THE INVENTION

The present invention relates to a diffractive optical element (DOE) and to a method for the manufacture thereof, preferably a DOE for generating particularly close meshed far field distributions for applications in the LIDAR field.

BACKGROUND

LIDAR (light detection and ranging) is increasingly gaining in importance in the surroundings identification of motor vehicles or robots. Even though different technical specific embodiments exist, the presence, distance, and possibly speed of other objects are generally detected by the emission of light and detection of the radiation reflected by illuminated surfaces. In particular, these are mostly systems which use a laser beam for scanning the surroundings.

For example, a LIDAR is known from EP 0 648 340 B 1, with the aid of which an obstacle avoidance system for helicopters and airplanes can be implemented.

The range of a LIDAR system is limited, among other things, due to the fact that a decreasing number of photons find their way back to the detector as the distance from a reflecting surface increases, and at some point their detection or an evaluation of the reflected signal is no longer possible. While the range can be increased by increasing the laser power, this approach has certain upper limits. It can therefore be useful to divide the intensity among multiple individual emitters (for example within a laser bar) to achieve the necessary optical powers. In particular, the necessary laser currents and the driver losses can thus be limited. The beams emitted by the individual emitters are generally not coherent with one another.

The output beam of a single laser emitter (for example of a laser diode or a solid-state laser) is (self-)coherent and generally has a Gaussian intensity distribution (or can at least approximately be described by an ideal Gaussian beam). For many technical applications, however, a Gaussian beam is not sufficient, so that often beam shaping is used to shape the Gaussian beam of a laser into another beam profile. If a certain beam profile is required only in the far field, in particular diffractive optical elements (DOE) can be used for shaping coherent radiation (so-called diffractive beam shapers) due to their low manufacturing costs. It is essentially possible to distinguish between three different categories of DOE. However, it is also possible to combine multiple functions from different categories with one another in a single DOE. In general, for this purpose, a DOE has a microstructured surface optimized for the generation of a certain diffraction pattern as a so-called diffractive structure.

Beam splitters fall into the first category of DOE. Examples include binary gratings or triangular gratings (1×2 beam splitters). These are used, in particular, where an individual Gaussian beam is to be split in a certain manner. In particular, these can also be used to generate gratings from multiple individual beams extending in parallel next to one another. The split beams can also propagate in different directions. Due to the geometry of the diffractive structure, constructive interference (so-called diffraction orders or orders) occurs on a rectangular grating (in the spatial frequency space or k-space). Through numerical algorithms (for example, phase retrieval using the Iterative Fourier Transform Algorithm (IFTA)), it is possible to implement a wide variety of arrangements of active orders. However, it should be noted that, in the application, the angular separation of the diffraction orders must be large enough with respect to the far field divergence of the incident illumination wave. The rule of thumb here is that the separation of the individual orders corresponds to at least twice the divergence as a full angle.

Diffusers are in the second category of DOE. The individual diffraction orders are no longer separated from one another compared to the far field divergence of the illumination wave. Due to the incoherent superposition of different speckle patterns, for example with a multimodal illumination, averaging of the speckle contrast in the far field occurs. Unimodal illumination generally creates a contrast ratio of 100% due to constructive and destructive interference in adjoining diffraction orders.

Beam shapers form the third category of DOE. Traditional examples are Gaussian to top hat beam shapers or converters for generating line or pattern profiles. The basic design is usually based on a geometrical optical solution of an inverse problem (see, for example, Fred M. Dickey, "Laser Beam Shaping: Theory and Techniques," Second Edition, CRC Press (2014)). If necessary, a post-processing of the geometrical optical solutions can take place thereafter with the aid of wave-optimized design methods (for example IFTA). In general, optical configurations for beam shapers are extremely complex in terms of their adjustment.

When designing DOE, the far field divergence of the illumination wave generally specifies the minimum distance of the achievable diffraction orders. When a drop below this lower limit occurs, interferences of adjoining diffraction orders become significant, and the uniformity of the far field intensity is impaired. It is therefore not possible to drop below certain minimum distances in the structures in the far field with the aid of a DOE for an illumination beam (laser beam) having a certain wavelength and divergence. In other words, the far field structures generated with a DOE always require a sufficient distance between the areas of high intensity (interference maxima) and low intensity (interference minima). Known DOE are therefore not suitable for generating particularly close meshed far field distributions (for example multiple individual spots extending in parallel to and directly abutting one another). This is a known problem of DOE, which previously has accordingly limited the development and the practical use of such elements.

SUMMARY

According to the present invention, a diffractive optical element (DOE) is provided which avoids, or at least considerably reduces, the problems which occur in the related art with respect to the generation of particularly close meshed far field distributions.

A DOE according to the present invention includes at least two diffractive structures which are situated next to one another and have differing functionalities, the diffractive structures being designed to generate diffraction patterns that do not interfere with one another in the far field as an overall diffraction pattern (in terms of an incoherent addition of the individual coherently generated diffraction patterns) when irradiated independently of one another with incoherent laser light.

When a diffractive structure, for example a microstructured surface designed to generate a certain beam profile or spot pattern in the far field, is illuminated with coherent laser light, a change in the original beam profile of the laser light occurs when passing (transmissive diffractive structure) through the structure or reflected (reflective diffractive structure) on the structure. In particular, an incident Gaussian laser beam can be broken down into a plurality of individual beams (beam splitter) and/or a conversion into top hat or rectangular profiles can take place. Diffractive structures are also particularly suitable for the generation of certain line or grating patterns. An optical component on which a diffractive structure is situated is referred to as a DOE.

A DOE according to the present invention includes at least two diffractive structures situated next to one another, it being possible for an arrangement next to one another to be present both in the horizontal and in the vertical direction. Preferably, at least two diffractive structures are situated directly next to one another. The at least two diffractive structures of a DOE according to the present invention have differing functionalities.

In particular, two diffractive structures can have microstructurings that deviate from one another. A differing functionality exists, for example, when the diffraction patterns thus generated by the diffractive structures differ from one another (for example differing spot patterns or grids). A difference can also exist in that, while the two diffractive structures, in principle, generate the same diffraction figures in the far field, these structures occur in different active orders or the diffractive structures have different sets of active orders.

As with a simple diffraction grating, individual orders can also be deliberately suppressed with the aid of a DOE. With a blazed grating, for example, a certain order is particularly preferred, while all other orders are drastically weakened or suppressed. The effectively present orders are then referred to as active orders. With a DOE, for example, only the orders −2, 0, +1, +2 could be present as active orders in a diffraction pattern. The establishment of a limited selection (i.e., a certain set) of active orders during the manufacture of a diffractive structure (design orders) takes place analogously to the grating diffraction.

The creation of individual diffraction orders can also be expanded to several dimensions. For example, it is also possible to generate diffraction orders in two spatial directions orthogonal to each other with the aid of a conventional crossed grating. A certain diffraction order is then usually indicated in the form of an ordered pair. The indication of an order (+1, −2) can mean, for example: first order diffraction maxima from the right in the x direction, and lower second order diffraction maxima in the y direction. It is also possible to generate multiple intensity maxima in the propagation direction, for example by using multi-focal lenses, preferably integrated as a diffractive lens in the diffractive structure.

It is therefore an idea of the present invention that a DOE according to the present invention includes at least two diffractive structures having differing functionalities that are irradiated by illumination waves that do not interfere with one another, it being possible for an overall diffraction pattern having particularly close meshed or even superimposing spots to result in the superimposed far field.

An advantage of the DOE according to the present invention is that these are particularly well-suited for generating a shared uniform far field distribution (overall diffraction pattern) having a sharp edge drop ("uniform spot") when using multiple laser emitters (laser diodes) situated closely together for the mutually independent irradiation of the diffractive structures situated next to one another with incoherent laser light. In particular, future LIDAR systems require a division among multiple laser emitters to achieve the necessary optical powers and to limit the necessary laser currents and the driver losses. The use of DOE according to the present invention is therefore of particular interest in this regard. Further fields of application can also be found in laser material processing, for example.

A DOE according to the present invention can, in particular, be designed to form a plurality of spaced apart rows made up of individual spots in each of the diffraction patterns generated by the diffractive structures, the overall diffraction pattern generated thereby forming a closed field made up of individual directly abutting single spots. The presence of at least two diffractive structures, which are preferably situated directly next to one another, having differing functionalities (differing diffraction patterns and/or differing active orders) is essential for this purpose.

If the at least two diffractive structures, which are situated next to one another and have differing functionalities, are irradiated independently of one another with incoherent laser light for the mutually independent generation of a diffraction pattern, the generated diffraction patterns superimpose in the far field to form a shared overall diffraction pattern, without mutual interferences occurring between the individual diffraction patterns. In this way, both the diffraction patterns per se and their respective individual features (for example, individual spots in a diffraction pattern) can be combined uninfluenced next to one another or superimposed to form an overall diffraction pattern (addition of the intensities of the individual diffraction patterns).

Preferably, the generated diffraction patterns are situated next to one another or in an at least partially superimposing manner in the far field. Analogously to the arrangement of the diffractive structures, next to one another here can refer to both the horizontal and the vertical direction. A full superimposition (i.e., overlap) of the diffraction patterns is most particularly preferred.

Preferably, the diffractive structures situated directly next to each other differ in an active order by at least +1 or −1, i.e., by plus or minus one diffraction order. Reference is made in this regard to the example of four diffractive structures situated directly next to one another for generating a row of points shown in FIG. 6, and to the related description. The generated diffraction patterns can be identical here in terms of the shape (e.g., individual spots). Due to the differing active orders of the diffractive structures, however, the positions and distances of the individual spots can be freely determined in the far field.

Figure 5:
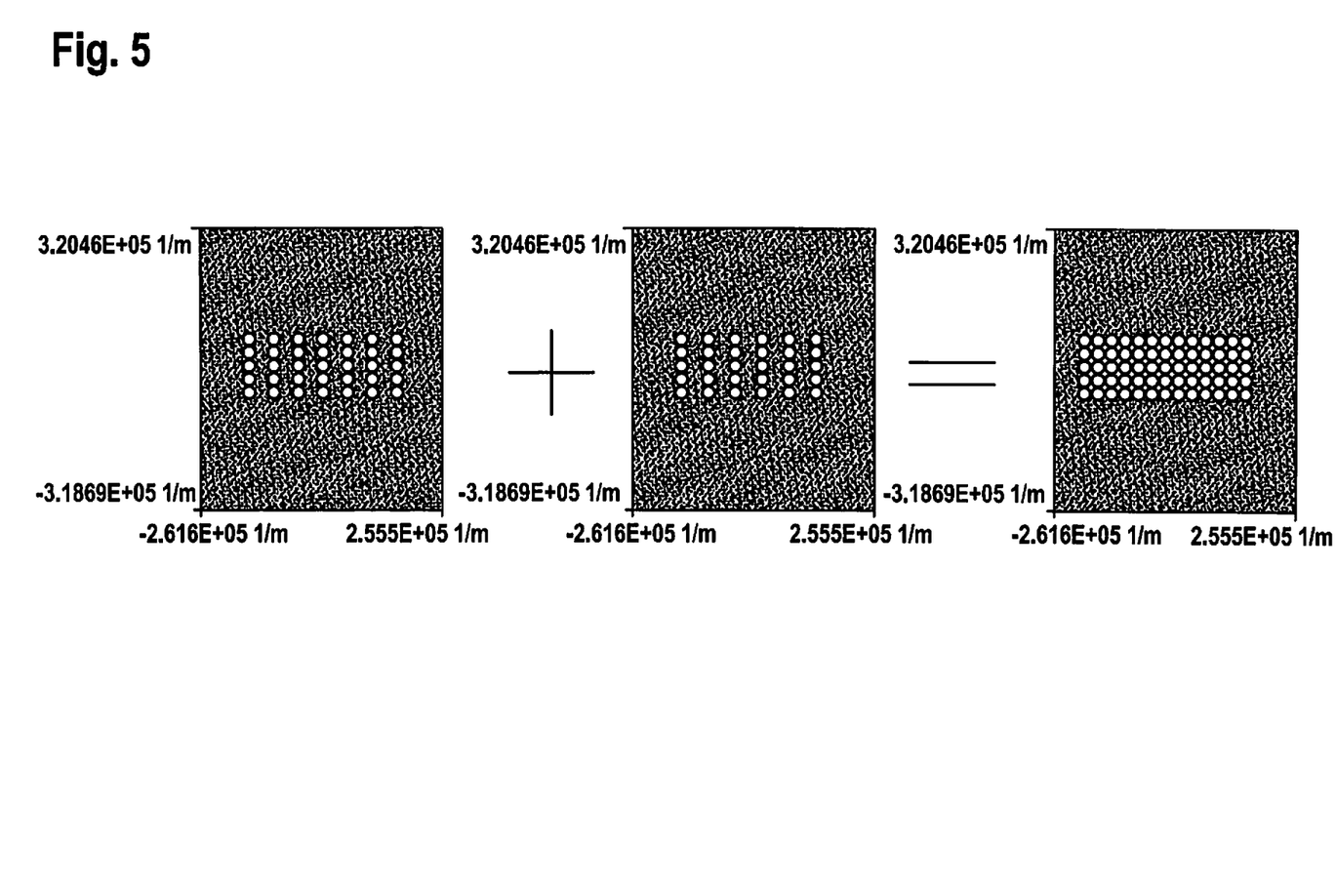
FIG. 5 shows homogenized superimpositions of diffraction patterns shown in FIG. 3 to form an overall diffraction pattern according to an example embodiment of the present invention.

Preferably, the diffraction patterns generated by the diffractive structures are each a plurality of spaced apart rows made up of individual spots, the generated overall diffraction pattern forming a closed field made up of individual directly abutting single spots. Such a fine meshed spot pattern is shown at the right of FIG. 5, for example. As a result of the design according to the present invention of the diffractive structures of a DEO, the maximum density of the individual features in the overall diffraction pattern can be considerably increased compared to a corresponding completely coherent pattern generation.

For varying the intensity of the generated diffraction pattern, at least one diffractive structure preferably includes an element for weakening. In the simplest case, the element for weakening can be a filter. It can be implemented, for example, in the form of a grayscale filter having different absorption degrees for different diffractive structures. The weakening element can, in particular, be designed as an integral part of a diffractive structure. Furthermore, the weakening element can be at least assigned to a diffractive structure (for example, situated in front or behind), such a combination being equal to an integral element for weakening. The weakening element can be used, in particular, for standardizing the intensities between the individual diffraction patterns. For example, if two diffractive structures have a different number of active orders, the diffraction pattern having the lower number of active orders will tend to appear brighter since the irradiated overall intensity is divided among fewer orders. The weakening element can be utilized, in particular, for compensating for this effect.

A method, according to an example embodiment of the present invention, for manufacturing a diffractive optical element (DOE) includes: (a) establishing a target distribution for the overall diffraction pattern of the DOE (for example, by establishing a certain number and arrangement of individual spots); (b) discretizing the target distribution using at least two diffraction patterns (breaking down the target distribution into sub-target distributions that are independent of one another, for example, by a division of the individual spots in the overall diffraction pattern among two sets A and B, the set A+B including all individual spots in the overall diffraction pattern); (c) determining an appropriate number of diffractive structures from the at least two diffraction patterns, an adjustment of the active orders as a function of the far field divergence of the illumination and of the distance and position of the diffractive structures taking place for situating the diffractive structures next to one another (for example, determination of the diffractive structures for generating the individual spots present in set A and of the diffractive structures for generating the individual spots present in set B, the active orders of both diffractive structures being matched to each other, taking the far field divergence of the illumination and their mutual position into consideration, in such a way that a desired superimposition corresponding to the target distribution of the generated diffraction patterns is generated); and (d) providing a DOE having the appropriate number of diffractive structures which are situated next to one another and have differing functionalities, the diffractive structures being designed to generate diffraction patterns which do not interfere with one another in the far field as an overall diffraction pattern when irradiated independently of one another with incoherent laser light, the overall diffraction pattern corresponding to the target distribution.

Preferably, the method according to the present invention furthermore includes a determination of the overall efficiency and of the intensity of the individual diffraction orders of the diffractive structures after the provision of the DOE.

Preferably, the method according to the present invention furthermore includes an optimization of the provided DOE based on the previously determined overall efficiency and the intensity of the individual diffraction patterns (or for individual features, such as individually generated spots or lines) of the diffractive structures by repeated application of the individual method steps for adapting the intensities in the individual diffraction patterns (or diffraction orders, see above) and the overall efficiencies for optimization of the intensity distribution in the overall diffraction pattern. The optimization can include an adaptation of the diffractive structures (i.e., structural functional optimization of the diffractive structures, for example for the profile optimization of the generated diffraction patterns). Furthermore, an optimization can also include the use of an appropriate weakening element (for example, to attenuate certain orders or of the entire generated diffraction pattern of a diffractive structure). The weakening element can, in particular, be utilized to weaken the intensity of all orders of a diffractive structure. Preferably, this is used to achieve a uniform intensity distribution in the overall diffraction pattern (uniformity).

The method is not limited to the provision of beam splitters as individual components (as a function of a diffractive structure) for the combined element (i.e., the DOE according to the present invention). The approach described here can also be applied, for example, to the close meshed arrangement of line patterns, the lines being generated with the aid of beam shapers of the above-mentioned third category.

The provision of a DOE according to the present invention can take place, for example, by injection molding or embossing methods. In this way, DOEs according to the present invention can be manufactured in very large quantities. Optical replication methods are also possible, in which the optical functionality is copied into a volume hologram, for example, which can then be duplicated via contact copies.

The present invention thus introduces a class of DOEs and a method for manufacturing such elements which make it possible to generate far field intensity patterns made up of multiple individual spots, in which the minimum separation of the diffraction orders is not limited, or is at least limited considerably less, by the far field divergence of the illumination source than is the case in the related art, the far field distribution avoiding the uniformity problems known from conventional diffuse beam shapers.

A further aspect of the present invention relates to a LIDAR system including a DOE according to the present invention, the LIDAR system including at least two laser sources for generating incoherent beams, the DOE including at least a number of diffractive structures situated next to one another having differing functionalities corresponding to the number of laser sources, and the diffractive structures being coupled to the laser radiation sources in such a way that diffraction patterns that do not interfere with one another in the far field are generated as an overall diffraction pattern when the diffractive structures are each irradiated independently of one another with one of the beams. The statements made with respect to the DOE according to the present invention and the described example embodiments can also be directly applied to a LIDAR system according to the present invention. The use of incoherent laser beams with a DOE according to the present invention for generating an overall diffraction pattern which is incoherently made up of multiple individual (and coherently generated) diffraction patterns of the individual diffractive structures is a characterizing feature.

A further aspect of the present invention relates to a motor vehicle including a LIDAR system according to the present invention, the LIDAR system being connected to a control system of the motor vehicle. A control system of a vehicle shall, in particular, be understood to mean an electronic control system for monitoring, controlling, and regulating an instantaneous vehicle state.

Exemplary embodiments of the present invention are described in greater detail based on the drawings and the following description.

DETAILED DESCRIPTION

Figure 1:
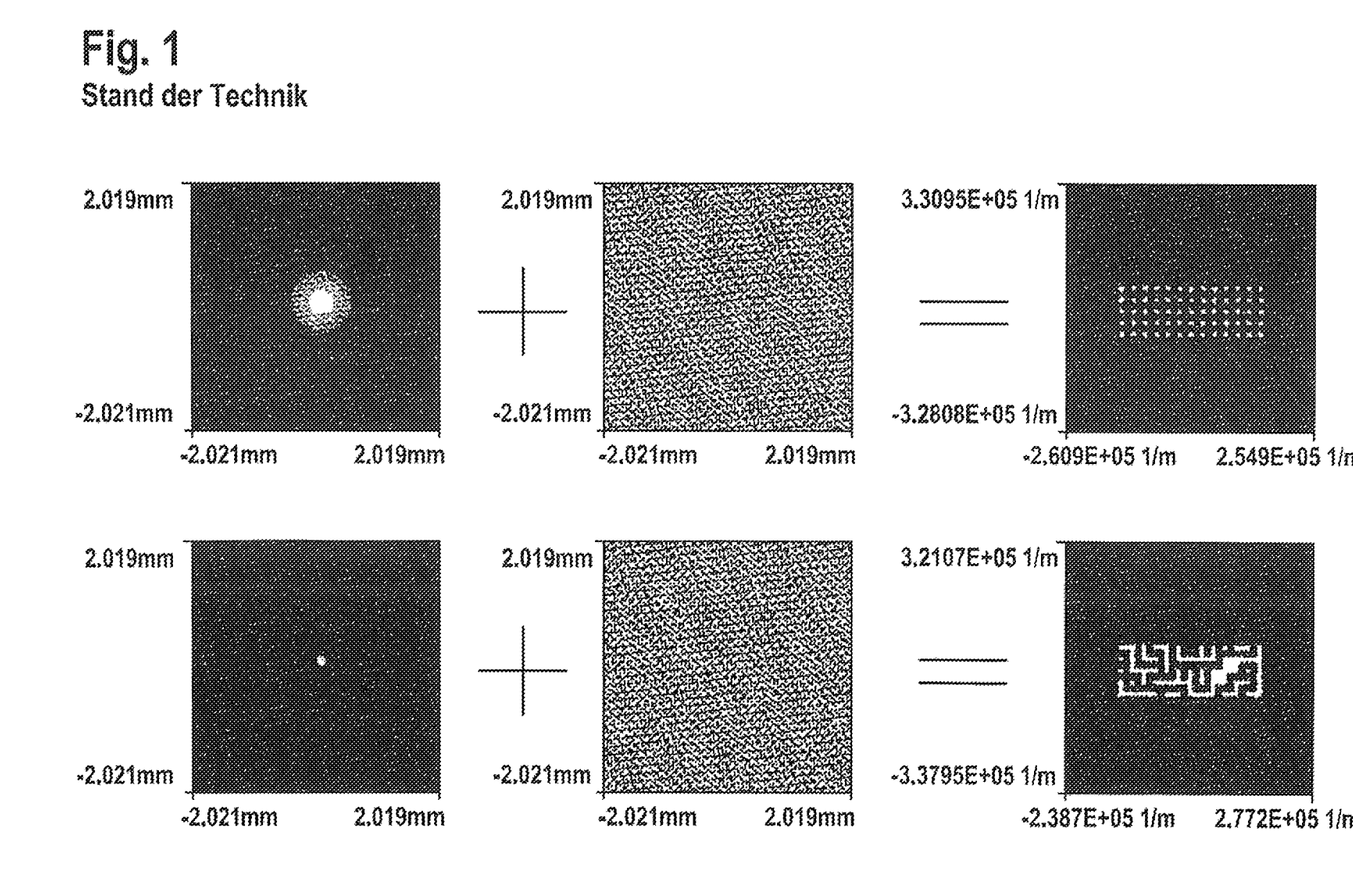
FIG. 1 shows a representation of different specific embodiments of diffraction patterns according to the related art generated with the aid of diffractive structures.

FIG. 1 shows a representation of different specific embodiments of diffraction patterns 32, 34, 36, 38 according to the related art generated with the aid of diffractive structures 12, 14, 16, 18. In particular, each of diffraction patterns 32, 34, 36, 38 generated by diffractive structures 12, 14, 16, 18 is a plurality of spaced apart rows made up of individual spots (13×5 beam splitter), it being possible to interpret the individual horizontal rows as different diffraction orders of a one-dimensional 13×1 beam splitter in a first direction, and of a one-dimensional 1×5 beam splitter in the direction perpendicular thereto.

In the top row, the creation of a diffraction pattern 32, 34, 36, 38 on the 13×5 beam splitter is shown from left to right, with the aid of diffractive structure 12, 14, 16, 18 of a conventional DOE 10, indicated in the center as the phase area, with an illumination, indicated on the left, by a Gaussian beam having a 250 μm waist radius (wavelength typically in the near infrared between 800 nm and approximately 3 μm). The separation of the individual orders is approximately 0.3°, and the far field divergence is approximately 0.15° (full angle). The orders in the far field are cleanly separated, and the uniformity error (for example, defined as a contrast $(I_{max}-I_{min})/(I_{max}+I_{min})$) in the active orders is clearly less than one percent.

In the bottom row, the creation of a diffraction pattern 32, 34, 36, 38 on the same 13×5 beam splitter is shown from left to right, with the aid of diffractive structure 12, 14, 16, 18, indicated also in the top row in the center as the phase area, with an illumination, indicated on the left, by a Gaussian beam having a 250 μm waist radius. The separation of the orders is approximately 0.3°, and the far field divergence is approximately 0.36° (full angle). The orders in the far field are no longer perceptible as being separated, constructive and destructive interference of adjoining diffraction orders occurs, and the uniformity error (for example, defined as a contrast $(I_{max}-I_{min})/(I_{max}+I_{min})$) in the active orders is as much as 100%. The undesirable interferences occur since the Gaussian beam utilized for illumination has a coherent radiation field, and a clean separation of the individual orders is no longer possible, among other things due to the divergence.

Figure 2:
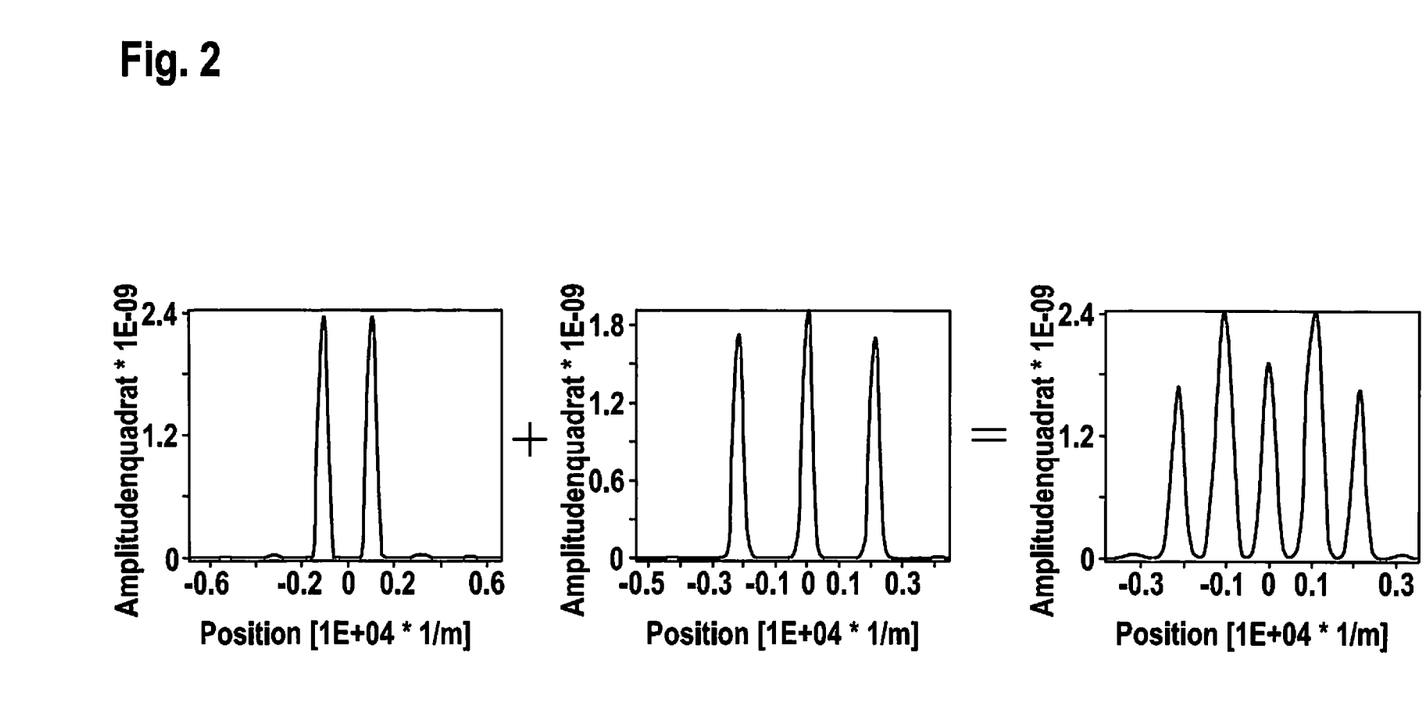
FIG. 2 shows a representation of a basic idea of the present invention based on an example of the superimposition of two one-dimensional diffraction patterns, according to an example embodiment of the present invention.

FIG. 2 shows a representation of the basic idea of the present invention based on the example of the superimposition of two one-dimensional diffraction patterns. A 1×2 and a 1×3 beam splitter having sufficient separation of the diffraction orders are designed, according to the present invention, as diffractive structures 12, 14, 16, 18 and combined with one another in such a way that the incoherent superimposition of the far field distribution results in a more close meshed point grating than would be possible with a single beam splitter with coherent illumination (for example, with the aid of a single illumination beam on a single diffractive structure 12, 14, 16, 18) according to the related art. The two beam splitters were not optimized with respect to the uniformity of the overall diffraction pattern 30. However, according to the present invention this can be achieved by an appropriate weakening element. In particular, the overall efficiency of the individual beam splitters and the resulting intensity in the individual diffraction orders can also be considered in the manufacture of the corresponding DOE 10. In a very simple example embodiment, this can be achieved through the use of filter elements (for example, gray filters).

Preferably, however, the number of the diffraction orders of individual diffractive structures 12, 14, 16, 18 is adapted in advance or, if necessary, iteratively in the manufacturing process in such a way to the overall efficiencies of individual diffractive structures 12, 14, 16, 18 that the incoherent superimposition meets the uniformity requirements of the desired target distribution. Particularly preferably, for example, diffractive structures 12, 14, 16, 18 having the same number of active orders and comparable efficiencies and uniformity are combined to thereby generate a preferably uniform superimposition in overall diffraction pattern 30. On the other hand, different numbers of active diffraction orders can also be deliberately used in individual diffractive structures 12, 14, 16, 18 to generate different intensity levels in the superimposed far field distribution, i.e., in overall diffraction pattern 30.

The left curve shows the separation of the orders by angular separation and the adequate far field divergence in a 1×2 beam splitter, while the curve in the center shows the separation of the orders by angular separation and the adequate far field divergence in a 1×3 beam splitter. The right curve, finally, shows the incoherent superimposition (summation of the corresponding intensities) of the two far field distributions of the 1×2 (left) and the 1×3 beam splitter (center) for generating a more close meshed point distribution in the far field, and simultaneously avoiding interference effects between adjoining diffraction orders (superimposed diffraction patterns).

Figure 3:
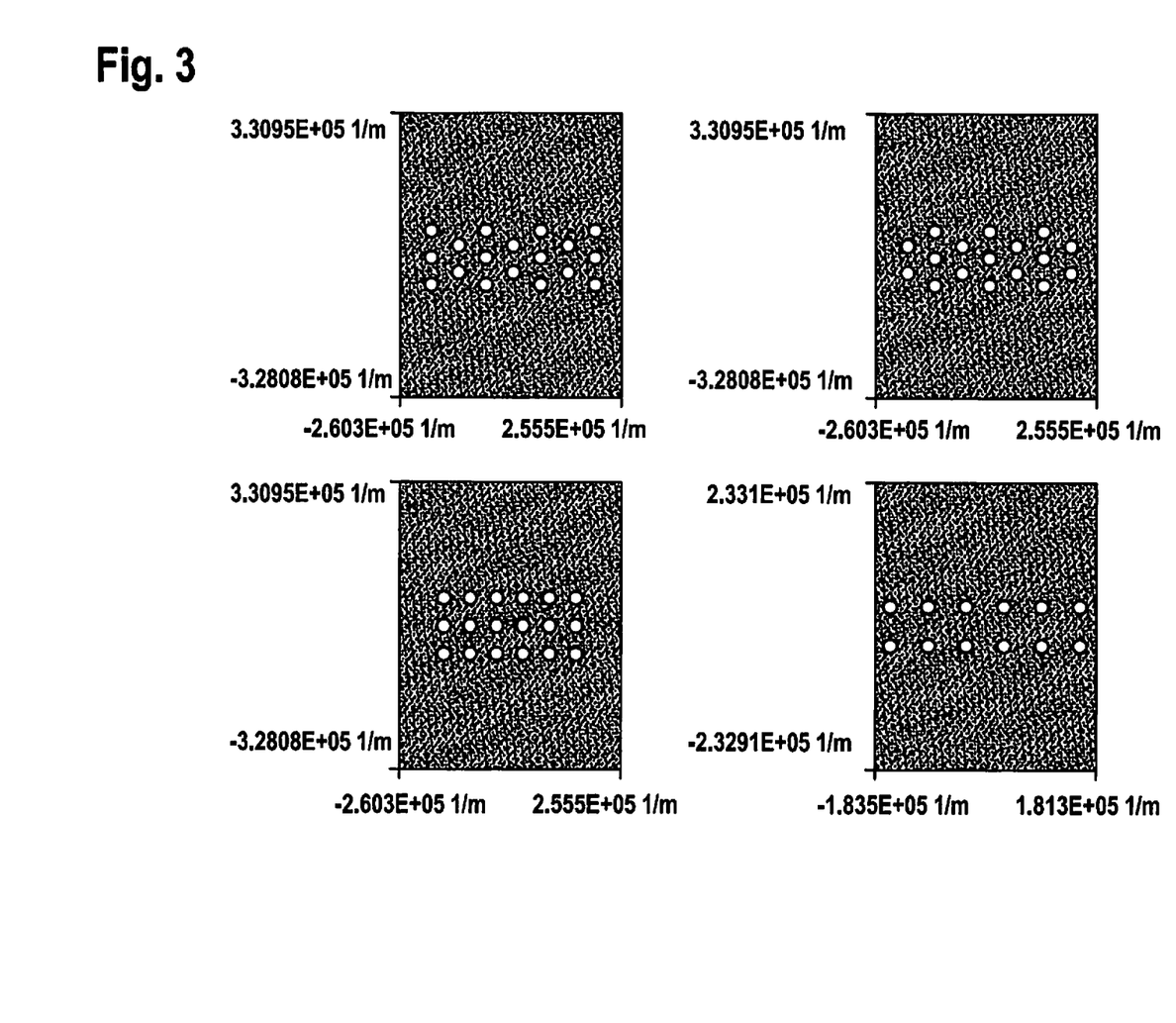
FIG. 3 shows a representation of diffraction patterns generated with the aid of diffractive structures according to different example embodiments of the present invention.

FIG. 3 shows a representation of different example embodiments of diffraction patterns 32, 34, 36, 38 generated by diffractive structures 12, 14, 16, 18. In particular, each of diffraction patterns 32, 34, 36, 38 generated by diffractive structures 12, 14, 16, 18 is a plurality of spaced apart rows made up of individual spots. The superimposition of all four shown diffraction patterns 32, 34; 36, 38 to form an overall diffraction pattern 30 results in a closed field made up of individual directly abutting single spots. In diffraction patterns 32, 34 shown in the top row, the horizontal rows of spots are situated offset from one another, while diffraction patterns 36, 38 shown in the bottom row include horizontal rows situated on top of one another without offset.

Figure 4:
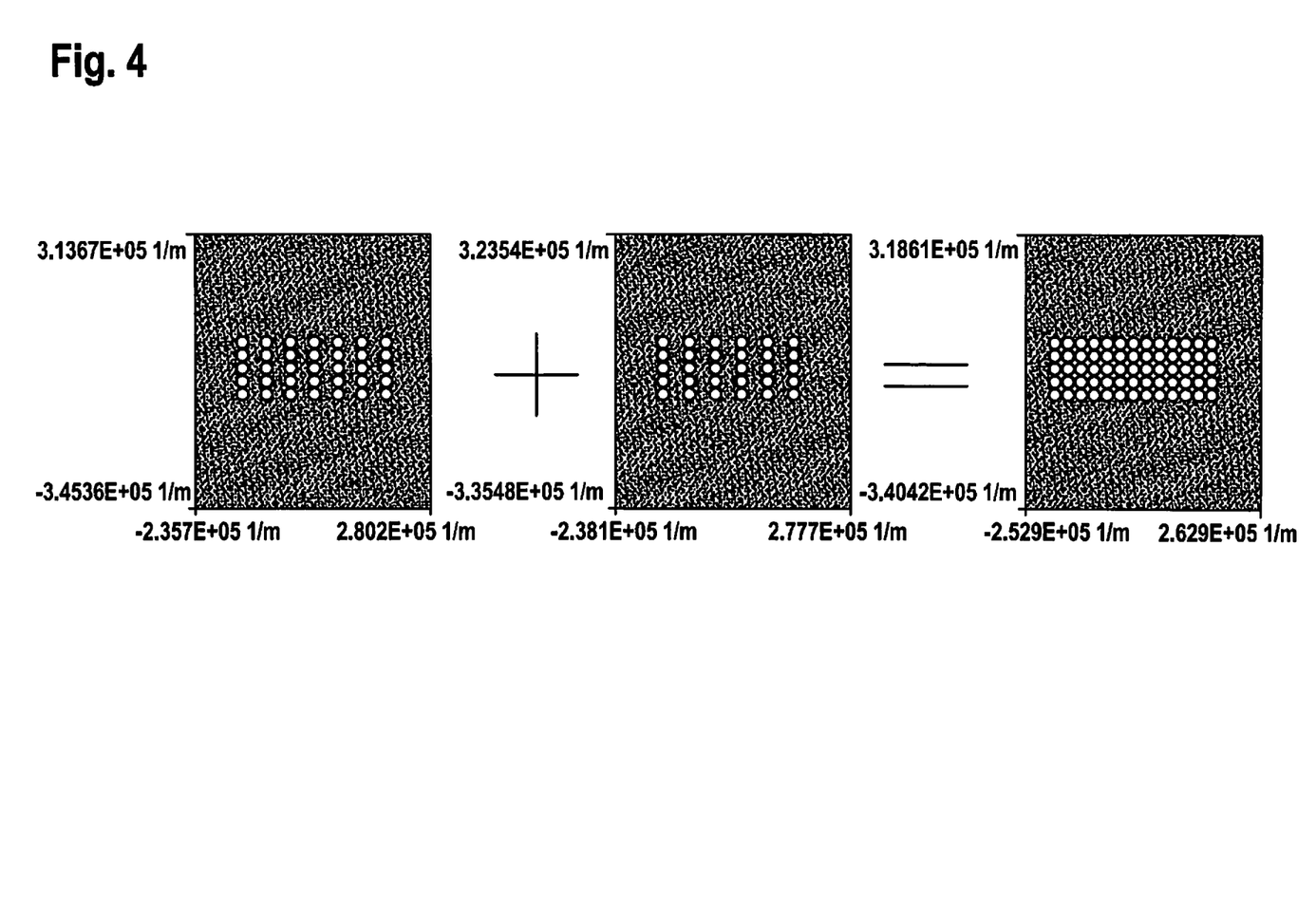
FIG. 4 shows simple superimpositions of diffraction patterns shown in FIG. 3 to form an overall diffraction pattern according to an example embodiment of the present invention.

FIG. 4 shows simple superimpositions of diffraction patterns 32, 34, 36, 38 shown in FIG. 3 to form an overall diffraction pattern 30 according to the present invention. Simple here means that a potentially different intensity of the individual spots due to different diffraction orders in diffractive structures 12, 14, 16, 18, for example due to different diffraction efficiencies in the respective diffraction orders, can result in inhomogeneities in the brightness of overall diffraction pattern 30. The left illustration shows the superimposition of the two diffraction patterns 32, 34 shown in the top row of FIG. 3. The illustration in the center, in contrast, shows the superimposition of the two diffraction patterns 36, 38 shown in the bottom row of FIG. 3. Finally, the right illustration shows the incoherent superimposition (summation of the corresponding intensities) of all diffraction patterns 32, 34; 36, 38 shown in FIG. 3 to form an overall diffraction pattern 30. The generated overall diffraction pattern 30 forms a closed field made up of individual directly abutting single spots.

With the aid of a DOE 10 according to the present invention, it is thus possible, in particular in the far field, to generate an overall diffraction pattern 30 having diffraction orders situated closely next to one another, whose angular separation may, for example, be considerably less than twice the full angle of the far field divergence of the illumination wave, without the formation of undesirable intensity drops occurring due to the interference of adjoining diffraction orders. By selecting the active orders on an angular grating which ensures the separation of the orders of individual diffraction patterns 32, 34, 36, 38 in the far field (for example, based on the rule of thumb that the order distance is at least two times greater than the spot diameter) and an offset arrangement of the spots present in diffraction patterns 32, 34, 36, 38 in the implementation of individual diffractive structures 12, 14, 16, 18, it is ensured that the individual orders of diffractive structures 12, 14, 16, 18 do not interfere with one another, while, at the same time, it is possible to achieve a close meshed arrangement of the spots in the superimposition for the generation of overall diffraction pattern 30.

The combination of only two different diffractive structures 12, 14, 16, 18 already allows, for example, the generation of line-shaped patterns with an illumination by, for example, laser light 22, 24, 26, 28 having beam waists of 100 μm independent of and coherent with one another. When additional diffractive structures 12, 14, 16, 18 are used, whose diffraction orders are vertically offset from those of diffractive structures 12, 14, 16, 18 already present, for example, the spots in the superimposition can be situated in an even closer meshed manner to generate uniformly wide lines.

FIG. 5 shows homogenized superimpositions of diffraction patterns 32, 34, 36, 38 shown in FIG. 3 to form an overall diffraction pattern 30 according to the present invention. Homogenized here means that a potentially different intensity of the individual spots due to different diffraction orders in diffractive structures 12, 14, 16, 18, for example due to different diffraction efficiencies in the respective diffraction orders, is taken into consideration in the generation of an overall diffraction pattern 30, so that a preferably uniform intensity distribution can be achieved in the superimposed far field distribution (standardization).

The left illustration shows the superimposition of the two diffraction patterns 32, 34 shown in the top row of FIG. 3. The illustration in the center, in contrast, shows the superimposition of the two diffraction patterns 36, 38 shown in the bottom row of FIG. 3. Finally, the right illustration shows the incoherent superimposition (summation of the corresponding intensities) of all diffraction patterns 32, 34; 36, 38 shown in FIG. 3 to form an overall diffraction pattern 30. The generated overall diffraction pattern 30 forms a closed field made up of individual directly abutting single spots, the individual spots having an essentially uniform maximum brightness or a uniform brightness distribution (uniformity).

For the homogenization, at least one diffractive structure 12, 14, 16, 18 can include a weakening element for varying the intensity of the generated diffraction pattern 32, 34, 36, 38. In the simplest case, the weakening element is a filter. It can be implemented, for example, in the form of a grayscale filter having different absorption degrees for different diffractive structures 12, 14, 16, 18 (or parts thereof). The weakening element can, in particular, be designed as an integral part of a diffractive structure 12, 14, 16, 18. Furthermore, the weakening element can be at least assigned to a diffractive structure 12, 14, 16, 18, such a combination being equal to an integral weakening element. Due to the superimposition of all four far field distributions, a close meshed spot pattern is thus created, which does not have the uniformity errors known from the related art.

Figure 6:
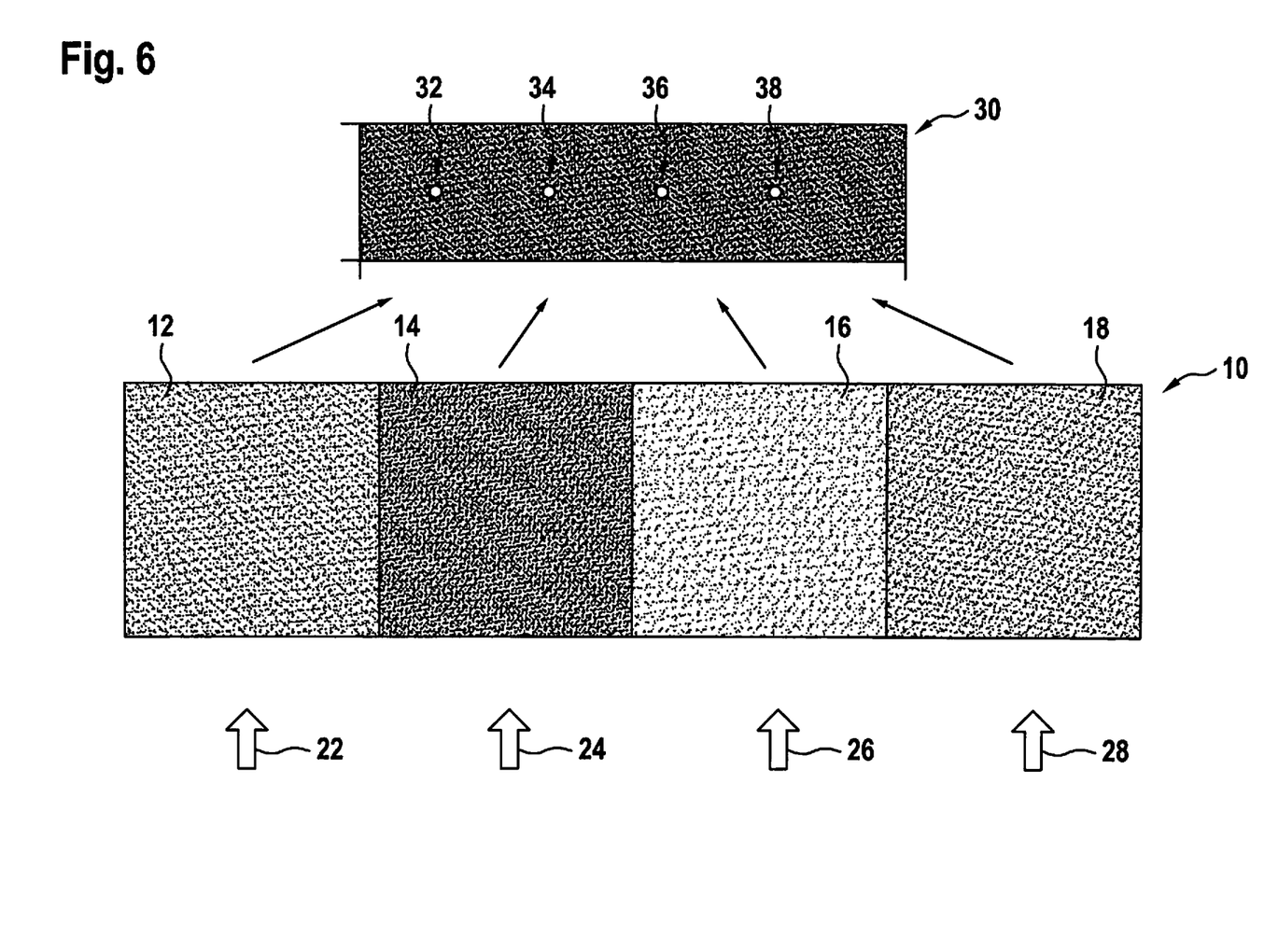
FIG. 6 shows a schematic representation of the generation of an overall diffraction pattern with the aid of a DOE according to an example embodiment of the present invention.

FIG. 6 shows a schematic representation of the generation of an overall diffraction pattern 30 with the aid of a DOE 10 according to an example embodiment of the present invention. The illustrated DOE 10 includes four diffractive structures 12, 14, 16, 18 situated directly next to one another and having differing functionalities (deviation in the active orders), diffractive structures 12, 14, 16, 18 being designed to generate diffraction patterns 32, 34, 36, 38 that do not interfere with one another in the far field as an overall diffraction pattern 30 when irradiated independently of one another with incoherent laser light 22, 24, 26, 28.

For the individual diffraction patterns 32, 34, 36, 38, in each case only the generation of a single spot ("0 divisor" or beam deflection) was assumed to simplify matters. Diffractive structures 12, 14, 15, 16 are each accordingly generating individual spots. The shown overall diffraction pattern 30 is thus made up of four single spots, each spot being assigned exactly to one diffractive structure 12, 14, 15, 16. This illustration has no limiting effect on the general nature. In particular, the generated overall diffraction pattern can also be made up of more complex diffraction patterns 32, 34, 36, 38 which at least partially superimpose one another (see FIG. 4). Furthermore, diffraction patterns 32, 34, 36, 38 generated by diffractive structures 12, 14, 16, 18 are each a plurality of spaced apart rows made up of individual directly abutting single spots, the generated overall diffraction pattern 30 forming a closed field made up of individual directly abutting single spots.

Diffractive structures 12, 14, 16, 18 situated next to one another CAN, in particular, differ in a design diffraction order (active order) by at least +1 or −1. Corresponding to the shown geometric conditions, in particular the design diffraction order of first diffraction order 12 could thus be situated at +2 (generation of the spot in first diffraction pattern 32 in the second diffraction order to the right of the central zeroth diffraction order), design diffraction order of second diffractive structure 14 could be situated at +1 (generation of the spot in second diffraction pattern 34 in the first diffraction order to the right of the central zeroth diffraction order), the design diffraction order of third diffraction structure 16 could be situated at −1 (generation of the spot in third diffraction pattern 36 in the first diffraction order to the left of the central zeroth diffraction order), and the design diffraction order of fourth diffractive structure 18 could be situated at −2 (generation of the spot in fourth diffraction pattern 38 in the second diffraction order to the left of the central zeroth diffraction order). The zeroth diffraction order is not implemented by DOE 10. The different diffraction orders thus indicate the direction (i.e., the angular deflection) of the radiation field extending from respective diffractive structure 12, 14, 16, 18 of DOE 10 according to the invention with respect to the zeroth order, i.e., with respect to the position of generated diffraction patterns 22, 24, 26, 28.

What is claimed is:

1. A LIDAR system comprising:
   at least two laser sources; and
   for each of the at least two laser sources, a respective corresponding diffractive structure coupled to the respective laser source, wherein:
   the corresponding diffractive structures are situated next to one another and are configured to, responsive to being irradiated independently of one another with incoherent laser light from beams of their respectively coupled laser sources, generate respective diffraction patterns that do not interfere with one another and that combine as an overall diffraction pattern in a far field; and
   at least one of the following four features (a)-(d):
   (a) each of the respective diffraction patterns is a respective pattern of a plurality of emitted components, and, in the overall diffraction pattern, at least one of the emitted components of the respective pattern of one of the respective diffraction patterns is arranged between a respective pair of the emitted components of the respective pattern of another one of the respective diffraction patterns, so that the emitted components of the one of the respective diffraction pattern and the emitted components of the other one of the respective diffraction patterns are interwoven in the overall diffraction pattern;
   (b) the diffraction patterns are each formed of respective emitted beams that are self coherent;
   (c) at least one of the diffractive structures includes a weakening filter and at least one other of the diffractive structures does not include any weakening filter so that respective intensities of their respective output diffraction patterns are standardized to each other;
   (d) the diffractive structures are structured differently from one another so that, for a pair of adjacent ones of the diffractive structures:
   a first one of the pair of the adjacent ones of the diffractive structures is configured to emit a respective beam in a first direction that is at a first angle relative to the first one of the pair of the adjacent ones of the diffractive structures;
   a second one of the pair of the adjacent ones of the diffractive structures is configured to emit a respective beam in a second direction that is at a second angle relative to the second one of the pair of the adjacent ones of the diffractive structures, the second angle being different than the first angle; and
   the first and second directions are oblique to each other.

2. The LIDAR system of claim 1, wherein the combination is formed by the diffraction patterns being situated next to one another in the far field in an at least partially superimposed manner.

3. The LIDAR system of claim 1, wherein each pair of immediately adjacent ones of the diffractive structures differ in an active order by at least one diffraction order.

4. The LIDAR system of claim 1, wherein each of the respective diffraction patterns generated by the diffractive structures is a plurality of spaced apart rows made up of individual spots, and the overall diffraction pattern forms a closed field made up of individual directly abutting single spots.

5. The LIDAR system of claim 1, wherein at least one of the diffractive structures includes the weakening filter, the weakening filter being configured to vary an intensity of the respective diffraction pattern generated by the respective diffractive structure.

6. The LIDAR system of claim 1, wherein the each of the respective diffraction patterns is the respective pattern, and, in the overall diffraction pattern, the at least one of the emitted components of the respective pattern of the one of the respective diffraction patterns is arranged between the respective pair of the emitted components of the respective pattern of the other one of the respective diffraction patterns, so that the emitted components of the one of the respective diffraction pattern and the emitted components of the other one of the respective diffraction patterns are interwoven in the overall diffraction pattern.

7. The LIDAR system of claim 6, wherein the emitted components are spots.

8. The LIDAR system of claim 1, wherein the diffraction patterns are each formed of respective emitted beams that are self coherent.

9. The LIDAR system of claim 1, wherein the at least one of the diffractive structures includes the weakening filter and the at least one other of the diffractive structures does not include any weakening filter so that respective intensities of their respective output diffraction patterns are standardized to each other.

10. The LIDAR system of claim 1, wherein the diffractive structures are structured differently from one another so that, for the pair of adjacent ones of the diffractive structures:
    the first one of the pair of the adjacent ones of the diffractive structures is configured to emit the respective beam in the first direction that is at the first angle relative to the first one of the pair of the adjacent ones of the diffractive structures;
    the second one of the pair of the adjacent ones of the diffractive structures is configured to emit the respective beam in the second direction that is at the second angle relative to the second one of the pair of the adjacent ones of the diffractive structures; and
    the first and second directions are oblique to each other.

11. The LIDAR system of claim 10, wherein the difference between the first and second angles is due to a difference in respective active orders of the pair of adjacent ones of the diffractive structures.

12. A motor vehicle comprising:
    a control system; and
    connected to the control system, a LIDAR system that includes:
    at least two laser sources; and
    for each of the at least two laser sources, a respective corresponding diffractive structure coupled to the respective laser source;

wherein:
the corresponding diffractive structures are situated next to one another and are configured to, responsive to being irradiated independently of one another with incoherent laser light from beams of their respectively coupled laser sources, generate respective diffraction patterns that do not interfere with one another and that combine as an overall diffraction pattern in a far field; and at least one of the following four features (a)-(d):
(a) each of the respective diffraction patterns is a respective pattern of a plurality of emitted components, and, in the overall diffraction pattern, at least one of the emitted components of the respective pattern of one of the respective diffraction patterns is arranged between a respective pair of the emitted components of the respective pattern of another one of the respective diffraction patterns, so that the emitted components of the one of the respective diffraction pattern and the emitted components of the other one of the respective diffraction patterns are interwoven in the overall diffraction pattern;
(b) each of the diffraction patterns are formed of respective emitted beams that are self coherent;
(c) at least one of the diffractive structures includes a weakening filter and at least one other of the diffractive structures does not include any weakening filter so that respective intensities of their respective output diffraction patterns are standardized to each other; and
(d) the diffractive structures are structured differently from one another so that, for a pair of adjacent ones of the diffractive structures:
a first one of the pair of the adjacent ones of the diffractive structures is configured to emit a respective beam in a first direction that is at a first angle relative to the first one of the pair of the adjacent ones of the diffractive structures;
a second one of the pair of the adjacent ones of the diffractive structures is configured to emit a respective beam in a second direction that is at a second angle relative to the second one of the pair of the adjacent ones of the diffractive structures, the second angle being different than the first angle; and
the first and second directions are oblique to each other.

* * * * *